Feb. 14, 1956 A. FINLAY 2,735,083

CODED CARRIER REMOTE CONTROL SYSTEMS

Filed Sept. 30, 1952 3 Sheets-Sheet 1

INVENTOR.
Alexander Finlay
BY W. L. Stout
HIS ATTORNEY

CODED CARRIER REMOTE CONTROL SYSTEMS

Filed Sept. 30, 1952 3 Sheets-Sheet 2

INVENTOR.
Alexander Finlay.
BY
W. L. Stout
HIS ATTORNEY

Feb. 14, 1956 A. FINLAY 2,735,083

CODED CARRIER REMOTE CONTROL SYSTEMS

Filed Sept. 30, 1952 3 Sheets-Sheet 3

INVENTOR.

Alexander Finlay.

BY

W. L. Stout

HIS ATTORNEY

United States Patent Office 2,735,083

Patented Feb. 14, 1956

2,735,083

CODED CARRIER REMOTE CONTROL SYSTEMS

Alexander Finlay, Swissvale, Pa., assignor to Westinghouse Air Brake Company, Wilmerding, Pa., a corporation of Pennsylvania Application September 30, 1952, Serial No. 312,341

3 Claims. (Cl. 340—163)

My invention relates to coded carrier remote control systems and particularly to systems for controlling and indicating different devices at a plurality of spaced stations from a remote office by coded carrier current, a carrier current being taken as a periodic current of a frequency which is above the usual voice frequency range.

In control systems of the type here contemplated several different devices or functions at each of two or more stations spaced apart are operated by local energy but controlled from a remote office. For example, on railroads, the track switches and wayside signals at isolated locations or field stations along a railroad are operated by energy supplied by sources at the individual locations but are controlled from a remote office. Such control systems using direct current coded on the time element principle are widely used on railroads. In these railroad control systems each code consists of a given number of long and short impulses of direct current arranged in different patterns, each of which selects a designated station and a designated function at that station. In one system having extensive use the codes comprise 16 impulses or steps of which the first eight are used to select the different stations and the last eight are used to select the different functions.

In these systems, the positions and conditions of each of the different functions of the different stations are indicated at the remote control office by similar codes sent from the different field stations to the remote office, each indication code selecting an indication device which identifies the sending station and the particular function of the sending station.

Ordinarily a line circuit is used for transmitting the coded current between the office and the field stations and two-way transmission is effected on a time sharing basis. That is to say, only one code can be sent at a time.

Remote control systems using coded alternating currents have been propsed wherwith an alternating current of a first frequency is used for the control codes sent from the office to the stations to select a designated station and a designated function. One method of providing indications for the different stations and functions is to provide an alternating current of a separate frequency for each station, but such an arrangement requires a large frequency spectrum when a number of stations are involved. Hence, it is desirable to have all the field stations use the same frequency for indication. A serious problem arises when the same frequency is used by all the field stations for sending indication codes because it is almost impossible to have each station generate exactly the same frequency. For example, in the case of two or more stations sending in currents at the same time, the currents received at the office may have a beat frequency due to the stations sending currents of slightly different frequencies, such beat frequencies tending to cause false code indications. Thus, in order for all of the stations to use the same frequency for indications it is necessary to assure that the currents generated at the field stations are identical.

Furthermore, when each station can initiate the sending of an indication code, some form of field station coordination is required so that when two or more stations attempt to send indication codes simultaneously only one station is permitted to complete the sending of its code and the remaining stations must wait their turns.

Accordingly, an object of my invention is the provision of a novel and improved system for controlling and indicating devices at each of a plurality of field stations by coded carrier currents.

Another object of my invention is the provision of improved apparatus for carrier control systems which enable codes based on the time element principle to be used.

A further feature of my invention is the provision of a coded carrier remote control system incorporating novel and improved means for providing the same carrier frequency at all of the stations for indication purposes.

A more specific feature of my invention is the provision of novel and improved means for making available at each of a plurality of field stations carrier currents which are identical.

Again, a feature of my invention is the provision of means for supplying a given pilot carrier to each of a group of stations and means at each station by which the pilot carrier is used as a basis for generating an indication carrier, the indication carrier being a selected multiple or submultiple of the pilot carrier frequency. In this way all the indication currents are identical.

Another feature of my invention is the provision of a control system of the type here involved incorporating improved means operable for effecting two-way transmission of control and indication coded carriers over a single two-wire line circuit.

Other objects, features and advantages of my invention will appear as the specification progresses.

In the system described herein, I attain the foregoing objects, features and advantages of my invention by the provision of improved carrier transmitters and receivers. For control codes, a normally active transmitter at the office is provided with novel means for keying the oscillator to provide codes of selected patterns of long and short pulses of the carrier. A coded carrier receiver at each of the field stations is normally active and ready to receive and each receiver includes means by which the coded carrier control current sent from the office is decoded and made effective to provide a designated control. In order to assure that the indication carriers generated at the field stations are all identical so that when two stations attempt to transmit simultaneously beat frequencies of the indication carriers received at the office are avoided, I provide a pilot carrier transmitter at the office or some other convenient location and the pilot carrier is constantly supplied to the transmitting medium which is usually a line circuit extending between the office and the different field stations. At each field station a pilot carrier receiver is constantly energized by the pilot carrier. Each field station is provided with an indication generator which utilizes the pilot carrier by applying the output of the pilot carrier receiver of the same station to an amplifier biased in such a manner that the pilot carrier is distorted and harmonics created. A selected harmonic is filtered out and further amplified and used as the indication carrier. For example, the second harmonic may be selected and filtered out. This selected harmonic is fed into a limiter stage and then to a power amplifier stage, the power output of which is coupled to the transmitting medium. Since all of the field stations use the same pilot carrier as the basis for generating the indication carrier, the indication carrier currents are identical. Each station is provided with means for keying the frequency distorting or converting stage and also the limiter stage and the indication current is coded and comprises long and short pulses. The pattern of the codes is determined according to the station and the function to be indicated. The office is provided with a receiver responsive to the indication carrier, the output of the receiver being fed through decoding means which selectively controls indication devices according to the code pattern of the current received.

To coordinate the field stations, the office preferably is provided with means for retransmitting the indication codes received from the field stations so that if two stations begin sending indication codes simultaneously the receipt of the retransmitted codes causes a disagreement between the transmitted and received codes at all but one station when only one station sends a long pulse. Such a station coordination arrangement is the subject matter of an application for Letters Patent of the United States Serial No. 358,334 filed May 29, 1953, by Paul K. Eckhardt for Coded Carrier Remote Control Systems, and which two applications are of common ownership. That is to say, this station coordination means which is described briefly in my present application is not my invention and is not claimed in this application.

I shall describe a preferred form of apparatus embodying my invention and shall then point out the novel features thereof in claims.

In the accompanying drawings.

In each of the several views like reference characters are used to designate similar parts.

Figure 1:
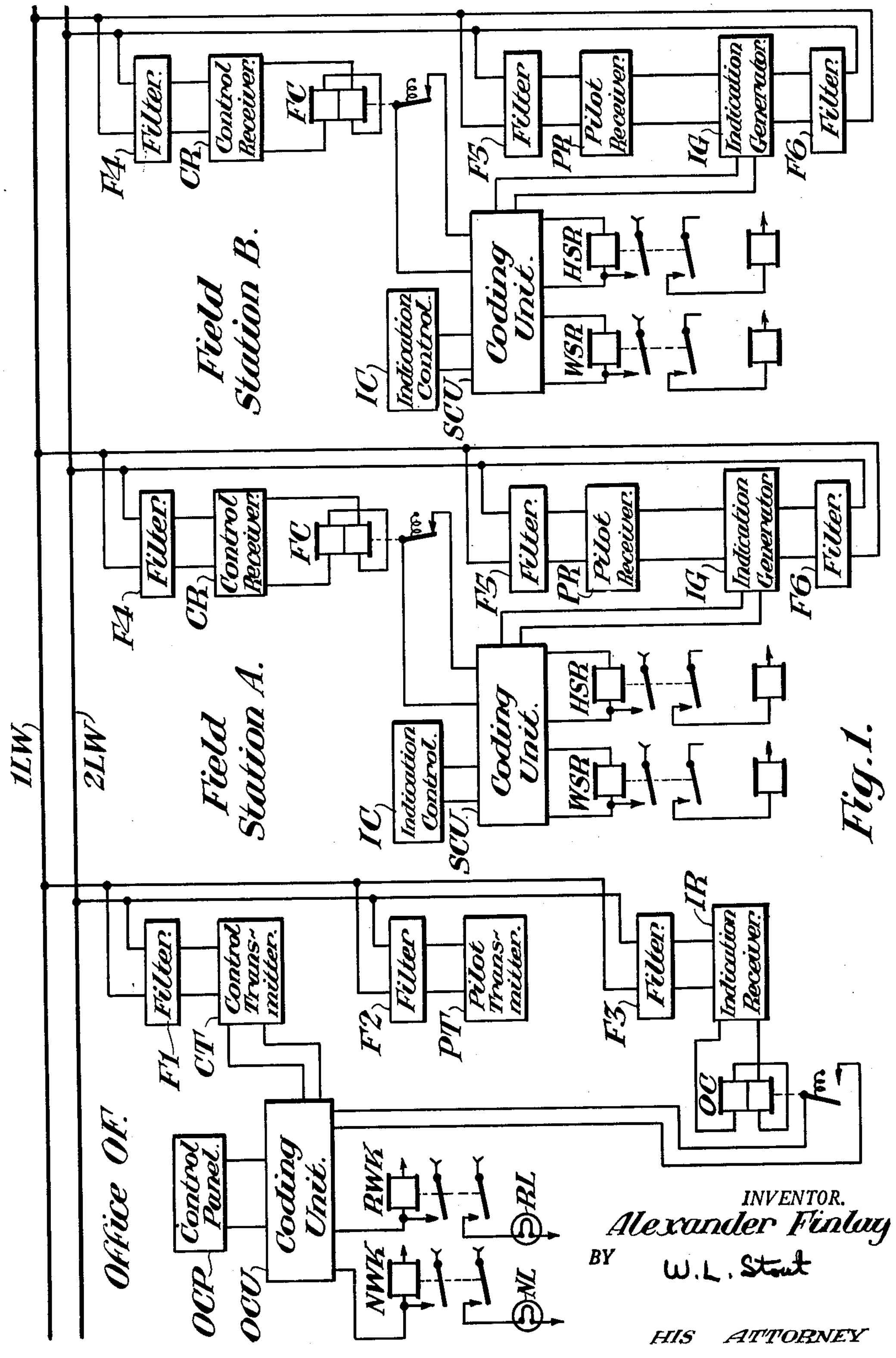
Fig. 1 is a diagrammatic view showing a coded carrier remote control system embodying my invention for an office and two field stations.

Referring to Fig. 1, there is shown diagrammatically the general arrangement of a coded carrier system embodying my invention for an office OF and two field stations A and B. It will be understood, however, that my invention is not limited to two field stations and a much larger number of stations may be involved.

The reference characters 1LW and 2LW designate a pair of line wires of a line circuit extending between the office and the field stations. This line circuit serves as a transmitting medium for the carrier currents used, but it is to be understood that the invention is not limited to a line circuit and transmission between the office and the stations may be by space radio or any other suitable medium. Furthermore, this line circuit may be an existing line circuit which is used for telephone, telegraph or some similar service and is used for the transmission of the carrier currents of the present control system as an additional service.

The office OF is provided with a control carrier transmitter CT, a pilot carrier transmitter PT and an indication carrier receiver IR which are connected in multiple across the line circuit 1LW—2LW through filters F1, F2 and F3, respectively. Each of these three filters includes elements tuned to pass a given individual carrier and to substantially suppress currents of other frequencies. As an aid in understanding my invention I shall assume by way of illustration that a carrier of the order of 9 kc. is used for control, a carrier of the order of 12.5 kc. is used as the pilot carrier and a carrier of the order of 25 kc. is used for the indication carrier. Thus, the control transmitter CT includes means, such as an electron tube oscillator, which generates the control carrier of 9 kc. and also includes means by which the oscillator is keyed to intermittently interrupt the carrier and form code patterns of the carrier so that the control carrier supplied to the line circuit is the carrier of 9 kc.

coded according to different code patterns, such patterns being preferably made up of short and long pulses of the current.

The pilot transmitter PT includes means, such as an electron tube oscillator, for generating the pilot carrier of 12.5 kc. constantly, this transmitter being permanently connected to the line circuit so that the pilot carrier is available at all times along the line circuit. While the pilot transmitter is shown as located at the office OF, this transmitter can be located at any convenient point and connected across the line circuit.

The indication receiver IR at the office includes means responsive to the indication carrier of 25 kc. and is connected to a code following relay OC which is adapted to be operated in step with the code pulses of the indication current.

The office is also provided with a coding unit OCU and a control panel OCP together with a group of indication relays. The coding unit OCU includes relay chains which serve to code or decode the carrier currents and it is adapted to be electrically connected either to the control transmitter CT for keying the control carrier according to a control code pattern set up by devices of the control panel OCP, or to be electrically connected to the code following relay OC of the indication receiver IR to decode the indication codes received from the line circuit and to electrically energize a group of indication relays according to the code. As shown in Fig. 1, only two indication relays NWK and RWK are shown since these are sufficient for a full understanding of the invention. The indication relays NWK and RWK control in turn indication lamps NL and RL, respectively.

The control panel OCP includes manually operable circuit controller levers each of which is assigned to a designated function at one of the stations and is connected to the coding unit in such a manner as to cause the unit to set up the designated code.

In Fig. 1, the devices of the office OF are shown conventionally in block form for simplicity and these separate devices will be described more fully in connection with Fig. 2. It is also to be understood that the invention is not limited to the specific carrier currents here referred to and these frequencies for the carrier currents recited are by way of illustration only.

The two field stations A and B have substantially the same apparatus and the same apparatus is provided at each of the other stations involved. Referring to station A of Fig. 1, the apparatus includes a control carrier receiver CR, a pilot carrier receiver PR, and an indication carrier generator IG. The input of the control receiver, the input of the pilot receiver and the output of the indication carrier generator are connected in multiple across the line circuit 1LW—2LW through filters F4, F5 and F6, respectively, each of which filters includes elements proportioned to pass the corresponding carrier frequency and to substantially suppress other frequencies. Thus the filters F4, F5 and F6 are proportioned to pass the carriers of 9 kc., 12.5 kc., and 25 kc. respectively, when the carriers are those here recited by way of illustration.

The control carrier receiver CR of station A includes means responsive to the control carrier supplied to the line circuit by the office transmitter CT and also means by which the code of the carrier is interpreted so that a code following relay FC is operated in step with the code of the control carrier sent from the office. The pilot carrier receiver PR includes means responsive to the pilot carrier here assumed as being of the frequency of 12.5 kc., and this receiver is constantly energized since the pilot carrier is constantly supplied to the line circuit. The output of the receiver PR is supplied to the indication generator IG which includes means effective to convert the pilot carrier of 12.5 kc. to an indication carrier here assumed as a carrier of 25 kc. Thus the indication generator is a frequency doubler, the output of which is passed to the filter F6 and thence to the line circuit.

The apparatus at station A also includes a coding unit SCU, an indication control means IC, and a group of control relays of which only the two relays WSR and HSR are shown in Fig. 1. The coding unit SCU at station A is adapted to be electrically associated with the receiver CR through the code following relay FC to decode the control code and energize a corresponding one of the control relays or to be electrically connected to the indication generator IG to key the indication carrier according to the condition set up at the indication control means IC.

These different devices at station A are shown in Fig. 1 in a conventional manner for the sake of simplicity and the apparatus will be described more fully in connection with Fig. 3.

The apparatus at station B and at each of the other stations which may be provided for the system is substantially the same as that provided at station A and the apparatus at station B need not be further described.

Figure 2:
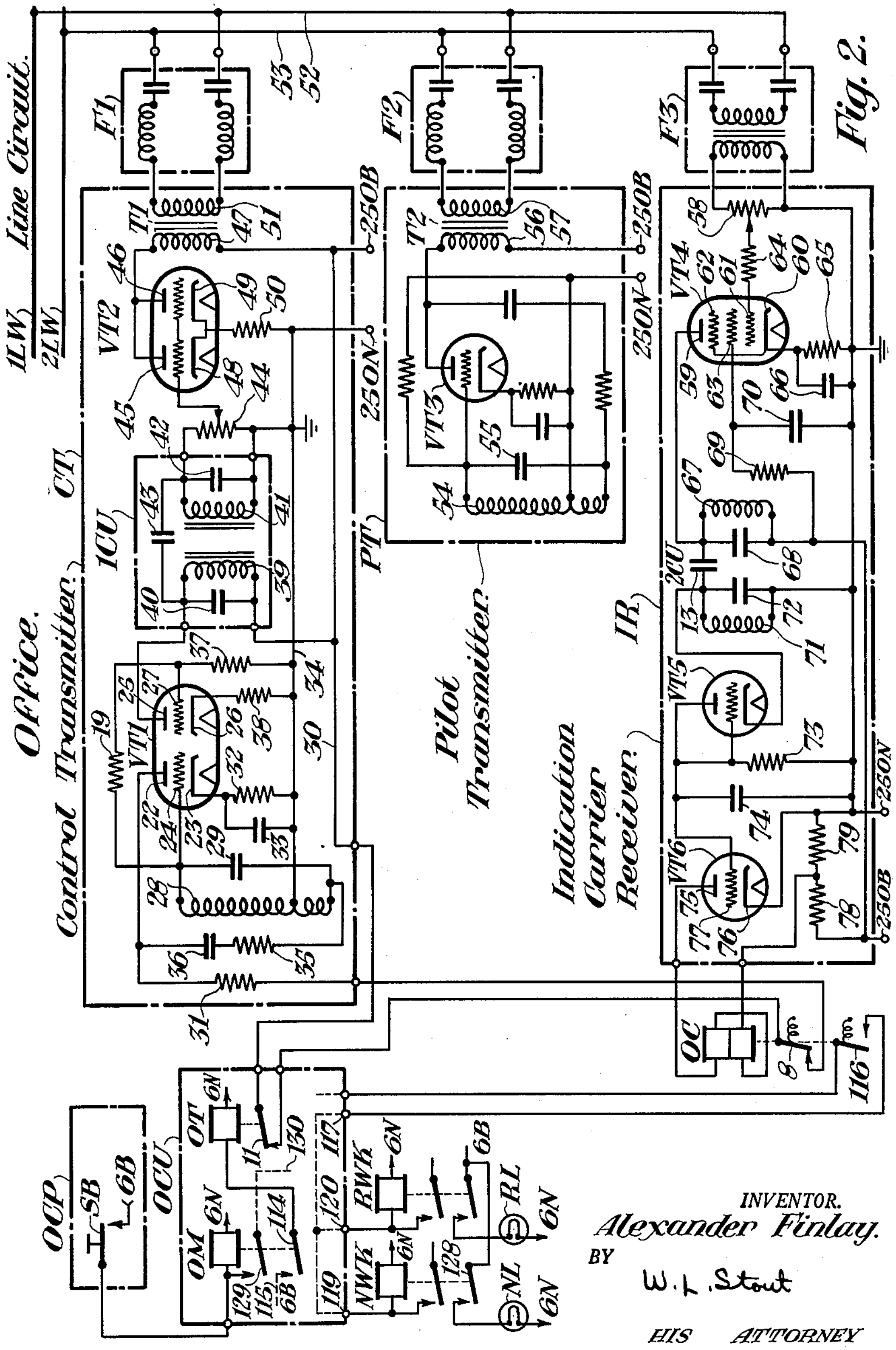
Fig. 2 is a schematic diagram showing one form of apparatus embodying my invention for the office of Fig. 1.

Referring to Fig. 2, which is a schematic diagram showing the apparatus at the office OF, the control transmitter which is indicated as a whole by a dot and dash rectangle CT, includes a triode tube VT1, the left-hand section of which as viewed in Fig. 2 is used as an oscillator stage and the right-hand section of which is used as a buffer amplifier stage. Specifically, the left-hand section of tube VT1 is provided with an anode 22, a cathode 23 and a control grid 24, and the right-hand section of the tube is provided with an anode 25, a cathode 26 and a control grid 27. It is to be pointed out at this time that the office OF as well as each of the stations is provided with a suitable source of power for supplying current at the proper voltages to the different tube circuits and also for control purposes. Preferably, the source of power would be a direct current source having high voltage positive and negative terminals identified by the reference characters 250B and 250N, respectively. Also, each source would have suitable low voltage positive and negative terminals identified by the reference characters 6B and 6N, respectively, and which low voltage is suitable for heater circuits of the electron tubes and for control purposes. Furthermore, the heater circuits for the different tubes are not shown since they would be according to standard practice and form no part of my invention, it being understood that the tubes are normally heated and in an active condition. Also, according to the usual practice in systems of the type here involved the negative terminal of the current source is connected to ground.

The oscillator section of the tube VT1 is provided with an oscillatory circuit consisting of an inductance 28 and a capacitance 29 tuned to resonance at the desired carrier frequency which has been assumed to be 9 kc. The oscillatory circuit is included in the control circuit for the tube, the cathode lead of which is completed through a biasing unit consisting of a resistor 32 and a capacitor 33 in multiple and an intermediate terminal of the inductance 28. The anode circuit for the oscillator tube section extends from terminal 250B over wire 30, a keying circuit comprising back contact 11 of a relay OT and normal contact 8 of a relay OC, to be referred to later, resistor 31, anode 22 and tube space to cathode 23, biasing unit 32—33, and wire 34 to the negative terminal 250N of the current source. The anode and control grid circuits are coupled through a connection including a resistor 35, capacitor 36 and the inductance 28.

This oscillator is of the resistance stabilized type and has excellent frequency stability. It operates as a class A device to provide low distortion. Also it is clear that the oscillator can be keyed by operating either one of the contacts 11 or 8 of the keying circuit, the anode circuit for the oscillator being closed and the control carrier generated when the keying circuit is closed. Hence the control carrier is coded on the time element principle, the carrier pulses being of a pattern corresponding to the closed and open periods of the keying circuit. The manner of controlling the keying circuit for keying the oscillator to provide code pulses of the control carrier will be described later.

This oscillator of the transmitter CT is coupled to the buffer amplifier section of tube VT1 through a coupling element consisting of a resistor 19 connected between the oscillatory circuit and the control grid 27 of the buffer amplifier tube section. The anode circuit for the buffer amplifier stage extends from the terminal 250B through wire 30, a tuned input circuit of a coupling unit 1CU to be described shortly, anode 25, tube space to cathode 26 and resistor 38 and wire 34 to the negative terminal of the power source. The control grid 27 of the buffer amplifier stage is provided with a grid leak resistor 37. Hence the carrier supplied by the oscillator stage of the transmitter is amplified by the buffer amplifier stage in the usual manner, the amplified carrier flowing in the tuned input circuit of the coupling unit 1CU, and which tuned circuit consists of an inductance 39 and a capacitance 40 in multiple.

The interstage coupling unit 1CU of the transmitter CT includes a pair of symmetrically tuned circuits, a first one of which consists of the inductance 39 and capacitance 40 described above and a second tuned circuit which includes an inductance 41 and a capacitance 42 in multiple and coupled to the first tuned circuit through capacitor 43, a load resistor 44 being connected across the second tuned circuit.

The parts of this coupling unit 1CU are constructed for the unit to have a relatively flat band pass characteristic which is wide enough to permit a steep rise in the carrier voltage from no carrier to the maximum carrier, this characteristic being desirable so that the length of the code pulse of the carrier passed by the coupling unit is substantially the same as that of the code pulse created by the keying of the oscillator. Also, the unit 1CU is characterized to suppress the higher order of the side band frequency components of the coded carrier. Thus, the carrier amplified by the buffer amplifier stage is passed by the unit 1CU and a corresponding voltage created across the load resistor 44. The voltage created at load resistor 44 is amplified by a power amplifier tube VT2 which as here shown is a two-section triode having its electrodes connected in multiple. The two anodes 45 and 46 of the tube VT2 in multiple are connected to terminal 250B of the power source through winding 47 of an output transformer T1, and the two cathodes 48 and 49 in multiple are connected to terminal 250N of the power source through a resistor 50. The two control grids of the tube VT2 are in turn connected to a selected terminal of the load resistor 44, one terminal of the load resistor 44 being grounded. Thus the control carrier pulses supplied to the load resistor 44 are amplified by the tube VT2 to a relatively high energy level. A secondary winding 51 of the output transformer T1 is connected to the input terminals of the filter F1, the output terminals of which are connected across the line circuit by wires 52 and 53, the filter F1 being provided with inductance and capacitance elements arranged in the well known manner and tuned to pass a carrier of the order of 9 kc. and to suppress other frequencies. It follows from the foregoing description of the transmitter CT that the control carrier is normally active and is keyed through the relay OT of the coded unit OCU according to the desired control code or by relay OC and the pulses of the control carrier are applied to the line circuit after being amplified to a desired energy level.

The pilot transmitter PT includes an electron tube VT3 and an oscillatory circuit including inductance 54 and capacitance 55 and is arranged as a resistance stabilized oscillator having circuits substantially the same as the circuits for the oscillator for the transmitter CT as will be apparent by an inspection of Fig. 2. Thus the oscillator circuits for the pilot transmitter PT need not be described in detail except to point out that the circuits are tuned to generate a carrier of 12.5 kc. which is supplied to winding 56 of the output transformer T2. A secondary winding 57 of the output transformer T2 is connected to the input side of the filter F2, the output side of which is connected across the line circuit. As explained hereinbefore, the filter F2 includes elements tuned to pass the pilot carrier frequency so that the pilot carrier is constantly supplied to the line circuit.

The indication carrier receiver IR at the office OF has an input load resistor 58 which is connected across the line circuit through the filter F3 having elements tuned to pass the carrier frequency here assumed to be of the order of 25 kc. Hence a voltage is developed across the resistor 58 in response to the indication carrier received from the line circuit, the voltage developed at resistor 58 being proportional to the strength of the indication carrier. The receiver IR comprises a carrier amplifier stage tube VT4, a coupling unit 2CU, a detector tube VT5 and a direct current amplifier stage tube VT6.

The carrier amplifier tube VT4 is preferably a pentode because of the operating characteristics of such a tube, but other types of tubes may be used. The tube VT4 is provided with an anode 59, a cathode 60, a control grid 61 and two additional grids 62 and 63. The control grid and cathode are connected across a selected portion of the input load resistor 58 through a resistor 64 and a biasing unit including a resistor 65 and a capacitor 66 in multiple. The anode-cathode circuit for the tube is connected across the power terminals through a first or input tuned circuit of the coupling unit 2CU, this tuned circuit comprising an inductance 67 and a capacitance 68. The grid 63 is connected to the terminal 250B of the power source through a resistor 69 and is provided with a by-pass capacitor 70, and the grid 62 is connected directly to the cathode of the tube. Consequently, the indication carrier voltage created across the resistor 58 is amplified and a corresponding current is caused to flow in tuned input circuit of the unit 2CU.

The coupling unit 2CU is provided with a second tuned circuit consisting of inductance 71 and capacitance 72 and coupled to the first tuned circuit by a capacitor 13. This unit is constructed to have a relatively flat band pass characteristic to permit a steep rise in the indication carrier from no carrier to a maximum value so that there is substantially no code distortion.

The detector tube VT5 of the receiver IR is a triode connected as a diode by having its control grid and anode connected together, the anode and cathode of the tube being connected to the tuned circuit of the coupling unit 2CU through a resistor 73 having a by-pass capacitor 74. The time constant of the resistor 73 and capacitor 74 is made small so that the detector will faithfully reproduce the code envelope of the indication carrier received from the line circuit.

The amplifier tube VT6 is a triode having an anode 75, a cathode 76 and a control grid 77. The control grid and cathode are connected to the detector and the anode circuit is provided with power from a voltage divider consisting of resistors 78 and 79 in series connected across the power terminals, the junction terminal of these resistors being connected to the anode 75 through the winding of the code following relay OC. The tube VT6 is proportioned so that it conducts current when no energy is applied to its control grid and the relay OC is normally energized and held at its normal or left-hand position against the bias force. When a code pulse is passed by the detector VT5, due to the indication carrier, the grid 77 of the amplifier tube VT6 is driven in the negative direction in potential with respect to the cathode 76 and the anode current is decreased with the result the code following relay OC is deenergized and its contacts are operated by the biasing force to their reverse position, that is, to the position opposite that shown in the drawing.

As stated hereinbefore, the office is also provided with a coding unit OCU which may be associated with the transmitter CT for forming the codes of the control carrier supplied to the line circuit, or it may be associated with the receiver IR for decoding the indication codes received from the line circuit. This coding unit OCU may be of different arrangements, there being several arrangements known to the art. For example, this coding unit may be similar to that described in Letters Patent of the United States No. 2,574,774, granted November 13, 1951, to George W. Baughman, for Remote Control Systems, or similar to that disclosed in Letters Patent of the United States No. 2,411,375, granted November 19, 1946, to Arthur P. Jackel, for Remote Control Systems. Reference is made to the above patents for a full disclosure and description of this coding unit and it is sufficient for the present application to describe this coding unit only briefly since the specific arrangement of the coding unit forms no part of my present invention.

The coding unit OCU includes a master relay OM which determines whether the unit OCU is associated with the control transmitter CT for sending control codes or with the indication receiver IR for interpreting the indication code received. The unit OCU is also provided with a counting chain of eight relays, not shown, which are energized consecutively during eight steps of the code and the action repeated during the second eight steps of a code, it being contemplated that each code comprises 16 steps, the first eight steps being used for station identification and the second eight steps being used for the different functions.

The unit OCU also includes a timing chain of slow release relays, not shown, and which are picked up or released to form short and long pulses of a code. When the master relay OM of the unit is released, the unit is electrically associated with the receiver IR and when the master relay OM is picked up the unit is then switched and associated with the transmitter CT. The relay OM is provided with a pickup circuit which includes the contact of a starting button SB at the control panel OCP and then is retained energized by a stick circuit that includes its own front contact 129 and a circuit network indicated by a dotted line 130, and which network is controlled by the relay chains of the unit so that the relay OM is retained picked up until a complete code is sent. When the master relay OM is released and the unit OCU is associated with the receiver IR, operation of the code following relay OC to intermittently close its contact 116, according to the indication code received, causes energy to be applied to terminal 117 of the unit OCU and in turn supplied to a circuit network by which positive energy is made to appear at terminal 119 or 120 according to the code and to which terminals 119 and 120 the two indication relays NWK and RWK are connected with the result that these relays are selectively energized according to the indication code. It is to be recalled that the group of indication relays would include as many relays as required for the different functions located at the different field stations but that only the two relays NWK and RWK are shown since these are sufficient for an understanding of the invention. With the relays NWK and RWK selectively energized according to the code, then the corresponding indication lamps NL and RL are selectively illuminated.

When the master relay OM is picked up closing its front contact 114, the transmitting relay OT of the unit is energized through a circuit network indicated by the dotted line 115 and which network is controlled by the relay chains of the unit in such a manner that relay OT is energized and deenergized according to the code that is to be sent, this code to be sent being determined by levers of the control panel OCP and which levers represent different functions at the different stations. According to my invention, the transmitting relay OT is used to key the oscillator of the control transmitter CT, the keying circuit including back contact 11 of the relay OT as explained hereinbefore. Thus, the oscillator of the transmitter CT is keyed to supply short and long pulses of the control carrier according to the intervals the back contact 11 of the transmitting relay OT is open and closed.

Figure 3:
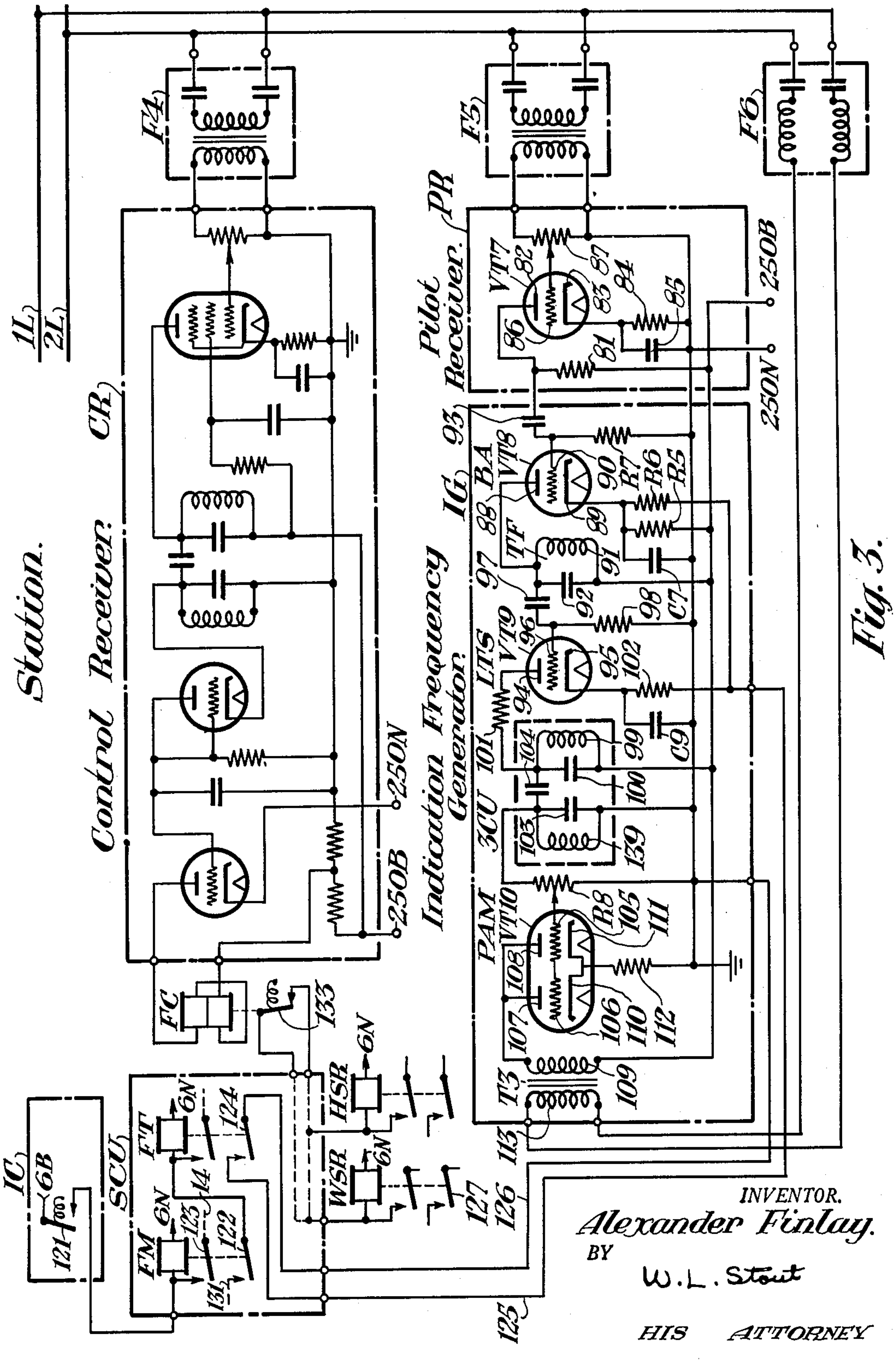
Fig. 3 is a schematic diagram showing one form of apparatus embodying my invention for a field station of Fig. 1.

Referring now to Fig. 3, which is a schematic diagram showing the apparatus of a field station, the control carrier receiver CR is of substantially the same construction as the indication carrier receiver IR of Fig. 2 and a description of the receiver CR need not be repeated except to point out that the receiver CR and its associated filter F4 are tuned according to the frequency of the control carrier and which frequency is here assumed as being 9 kc. Also, the code following relay FC connected to the output of the receiver CR is normally deenergized and held at its reverse or right-hand position and is operated in step with the code of the received control carrier.

The pilot carrier receiver PR includes a single stage amplifier tube VT7 which is shown as a triode, the anode circuit including terminal 250B, resistor 81, anode 82 and tube space to cathode 83, biasing unit consisting of resistor 84 and capacitor 85 in multiple, and terminal 250N. The control grid 86 of the tube is connected to a selected point of the load resistor 87 which is connected to the output of the filter F5, the input of which is connected across the line circuit and which filter, as explained hereinbefore, includes elements tuned to pass the pilot carrier frequency and suppress other frequencies. It follows that there is provided a pilot carrier voltage across the resistor 81, this voltage being available at all times because the line circuit is energized by pilot carrier at all times.

The indication carrier generator IG includes a converter amplifier stage BA, a frequency selecting tank circuit TF, a limiter amplifier stage LTS, a coupling unit 3CU and a power amplifier stage PAM.

The amplifier stage BA is provided with a triode VT8 having an anode 88, a cathode 89 and a control grid 90. The cathode 89 is biased by voltage derived by a voltage divider consisting of resistors R5 and R6 in series connected across the power source by a keying circuit to be referred to shortly. The cathode 89 is connected to the junction terminal of the resistors R5 and R6 and the control grid 90 is connected to ground through resistor R7 and is provided with a by-pass capacitor C7. The anode circuit of the tube VT8 extends from terminal 250B through frequency selecting or tank circuit TF consisting of inductance 91 and capacitance 92 in multiple, anode 88 and tube space to cathode 89, resistor R6 and the keying circuit including wire 125, contact 124 of a relay FT and wire 126 to the negative terminal 250N. The parts are so proportioned that the amplifier tube VT8 is biased to substantially zero anode current when the anode circuit is closed. That is to say, the tube is normally biased to cutoff. The control grid 90 of the tube VT8 is coupled to the load resistor 81 of the pilot receiver PR through a capacitor 93, and hence the pilot carrier when amplified by the tube VT7 is applied to the input of the tube VT8, which tube, as explained above, is normally biased to cutoff. It is to be seen therefore that anode current for the tube VT8 flows only during portions of the positive half cycle of the pilot carrier voltage due to the biasing of the tube VT8. This means that the output of the tube VT8 includes harmonics of the pilot carrier. The distortion of the pilot carrier is unsymmetrical and consequently even harmonics of the pilot carrier frequency appear in the output of the tube VT8. I shall assume that the frequency selecting or tank circuit TF is tuned to select the second harmonic of the pilot carrier but it is clear that other harmonics could be selected. Thus, there appears across the frequency selecting circuit TF voltages having a carrier frequency of 25 kc. that is, double the frequency of the pilot carrier.

The limiter stage LTS is provided with a triode VT9 having an anode 94, a cathode 95 and a control grid 96, the control grid 96 being coupled to the tank circuit TF through capacitor 97 and provided with a grid leak resistor 98 and a by-pass capacitor C9. The anode circuit for the limiter tube extends from terminal 250B through a tuned circuit consisting of inductance 99 and capacitance 100 of the coupling unit 3CU, resistor 101, anode 94 and tube space to cathode 95, resistor 102, and the keying circuit traced above to the negative terminal 250N. The parts are proportioned for the tube VT9 to function as a limiter and consequently the voltages of double the pilot frequency, that is voltage of 25 kc., applied to the tube VT9 are amplified to a substantially constant value over a reasonably wide range in the strength of the pilot carrier received from the line circuit.

The coupling unit 3CU includes a second tuned circuit consisting of inductance 139 and capacitance 103 in multiple and which is coupled to the first tuned circuit 99—100 by a capacitor 104, the ouput of the coupling unit 3CU being connected across a load resistor R8. The parts of the coupling unit 3CU are proportioned in a manner similar to the previous coupling units 1CU and 2CU, except they are tuned to pass pulses of the indication carrier 25 kc. with little or no code distortion.

The power amplifier PAM of the indication generator includes a twin triode tube VT10 having its electrodes connected in parallel, the control grids 105 and 106 being connected to a selected terminal of the load resistor R8, the anodes 107 and 108 in multiple being connected to terminal 250B of the power source through a winding 109 of an output transformer T3 and the cathodes 110 and 111 in multiple being connected to ground through resistor 112. Thus the indication carrier of 25 kc. applied to the power amplifier PAM is amplified to a relative high energy level and inductively transferred to the secondary winding 113 of the output transformer T3, and which winding is connected across the line circuit through the filter F6 which is tuned to pass the indication carrier.

The station coding unit SCU of Fig. 3 is similar to the office coding unit OCU in its construction and this unit SCU is adapted to be electrically associated with the indication generator IG for keying the indication carrier or to be associated with the control receiver CR to interpret the control code received at the station. The master relay FM of the unit SCU is normally deenergized and under this condition code operation of contact 133 of the code following relay FC completes a circuit connection in a circuit network in the unit SCU so that a group of control relays, of which relays WSR and HSR are two relays, are selectively energized according to the control code. These control relays, such as the relays WSR and HSR, when selected and energized complete operating circuits for different functions at the station, and which functions may be a track switch of a railroad operatively connected to a switch mechanism including an electric motor, or it may be some form of a railway signal operated to different positions by means of electric circuits.

When a function at the station is operated, and such operation is to be indicated at the office, a starting contact 121 is closed automatically by the operated function, and the closing of contact 121 completes a pickup circuit by which the master relay FM is picked up and the relay is retained energized through a stick circuit including its own front contact 123 and a network of the unit indicated by a dotted line 14. The picking up of the master relay FM closing front contact 122 prepares a circuit network indicated by a dotted line 131 for intermittently energizing the transmitting relay FT of the unit, the relay FT being picked up and released according to the code pattern preselected for indication of the operation of a given function. When the transmitting relay FT is thus operated to close and open its contact 124, according to the indication code, the generator IG is correspondingly started and stopped, that is, keyed, due to the contact 124 being interposed in the cathode leads of the tubes VT8 and VT9 of the indication generator. Thus, when the starting contact 121 is closed in response to the operation of a function at the station and the operation is to be indicated, the unit SCU is switched to the indication generator IG and the indication carrier is coded according to the code assigned to the function to be indicated, and the coded indication carrier is then supplied to the line circuit through the filter F6 for transmission to the office.

As stated hereinbefore, the apparatus at each of the stations of the system is substantially that disclosed in connection with Fig. 3.

It follows from the foregoing description of the apparatus embodying my invention for the office OF and for each of the stations of the system, that when a function at, say, station A, is to be controlled for operation, the office operator sets the office control lever associated with the control panel OCP of Fig. 2 according to the control that is to be effected and then presses the starting button SB. This causes the transmitter relay OT of the coding unit OCU to be operated and in turn key the control transmitter CT according to the corresponding code pattern and this coded control current is supplied to the line circuit and received at each of the stations. At the station A the coded control carrier is received and operates the control receiver CR of Fig. 3 causing the code following relay FC to be operated in step with the code pattern. This operation of the relay FC completes at its contact 133 the circuit connection for the station coding unit SCU and the unit is operated to interpret the code and energize the corresponding control relay which, for example, might be the relay WSR. The picking up of the control relay WSR, closing its front contact 127, completes an operating circuit, not shown, for the selected function and the function is operated as desired. At the completion of the operation of the function, the starting contact 121 of the indication means IC is closed so that the relay FM of the unit SCU is picked up and the coding unit switched to the indication generator IG. Since the pilot carrier receiver PR is constantly energized to energize the indication generator IG the code operation of contact 124 of the transmitting relay FT serves to code the indication generator so that there is supplied to the line circuit for transmission to the office an indication carrier coded according to the function to be indicated.

At the office OF the coded indication current is applied to the office receiver IR through the filter F3 and the relay OC in the output of the receiver IR is operated in step with the code pulses of the indication carrier. This code operation of contact 116 of relay OC completes the circuit network in the coding unit OCU so that the code is interpreted and a corresponding one of the indications, say relay NWK, is energized and picked up. With the closing of front contact 128 of the relay NWK the corresponding indication lamp NL is illuminated to indicate the operation of the function at the station.

It is to be pointed out that operation of contact 8 of the code following relay OC in response to the receipt of the indication code serves to open and close the keying circuit for the control transmitter CT at the office with the result that the code transmitter CT is actuated to retransmit the indication code to the line circuit by coding the control carrier 9 kc. Obviously, this retransmitted control carrier coded according to the indication code is received at each field station and applied to the station receivers CR to operate these receivers according to this code. As stated hereinbefore the structure for retransmitting the indication code is the subject matter of a copending application for Letters Patent of the United States, Serial No. 358,334, filed May 29, 1953, by Paul K. Eckhardt, for Coded Carrier Remote Control Systems, and this structure is not subject matter claimed in the present application and need not be further described.

Although I have herein shown and described but one form of coded carrier remote control systems embodying my invention, it is to be understood that various changes and modifications may be made therein within the scope of the appended claims without departing from the spirit and scope of my invention.

Having thus described my invention, what I claim is:

1. In a system for the control of indicators at a central office in accordance with the positions of movable contacts at different field stations by code pulses of a carrier current of a predetermined frequency transmitted over a single transmitting channel connecting the office and the field stations, a source of pilot carrier having a selected frequency different from said predetermined frequency, said source permanently coupled electrically to said channel and constantly active to supply the pilot carrier current simultaneously and constantly to each said station, pilot carrier receivers one at each said station connected to said channel and including means effective to pass said pilot carrier, frequency converter means one at each said station having connection to the pilot carrier receiver at the same station, each said converter means including a biased electron tube amplifier and a frequency selecting circuit, said amplifier tube having input and output electrodes, said input electrodes coupled to said pilot carrier receiver of the same station, said amplifier tube being biased to cutoff to create harmonics of the pilot carrier at the output electrodes of the amplifier, each said frequency selecting circuit coupled to the output electrodes of the amplifier at the same station and including inductance and capacitance tuned to resonance at a harmonic of the pilot carrier selected to correspond to said predetermined frequency, another amplifier tube having input and output electrodes with its input electrodes coupled to said selecting circuit and its output electrodes connected to an output circuit to create in the output circuit voltages of said selected harmonic, coding means at each said station having a coding contact interposed in the output circuit of said another amplifier tube to code the voltage of said selected harmonic according to the operation of said contact, filter means at each station to couple the output circuit of the station to said channel and including circuit elements tuned to pass said selected harmonic and suppress other frequencies, and an indication receiver at said office coupled to said channel and including means effectively energized by said coded harmonic.

2. In a remote control system, including a plurality of stations connected by a line circuit and a constantly active pilot carrier generator permanently connected to said line circuit; an indication carrier frequency generator at each of said stations connected to said line circuit through a receiving means effective to pass only said pilot carrier, said generator comprising a frequency converter means including a biased electron tube amplifier and a frequency selecting circuit, said amplifier tube having input and output electrodes with said input electrodes being coupled to said pilot carrier receiver of the same station, said amplifier tube being biased to cutoff to create harmonics of the pilot carrier at the output electrodes of the amplifier, each said frequency selecting circuit being coupled to the output electrodes of said amplifier at the same station and including inductance and capacitance tuned to resonance at a selected harmonic of the pilot carrier, another amplifier tube having input and output electrodes with its input electrodes coupled to said frequency selecting circuit and its output electrodes connected to an output circuit to create in the output circuit voltages of said selected harmonic.

3. In a remote control system using a carrier current for transmission of indication codes from a plurality of field stations to an office over a single transmitting channel adapted to transmit other carrier current, a generator of a pilot carrier current of a given frequency permanently coupled electrically to said channel and constantly active to supply said pilot carrier simultaneously and constantly to all said stations; an indication carrier transmitter at each station comprising a receiver coupled to said channel and effective to pass only said given pilot carrier frequency, a biased electron tube amplifier, a frequency selecting circuit, and another electron tube amplifier; each said biased amplifier tube having input electrodes which are coupled to the receiver at the same station and output electrodes which are coupled to said frequency selecting circuit, voltages having frequencies which are a multiple of said pilot carrier frequency being created at the output electrodes of said amplifier tube due to the bias of the tube, said frequency selecting circuit including inductance and capacitance tuned to resonance at a selected multiple of said pilot carrier frequency to select the corresponding harmonic voltage created at the output electrodes of said amplifier, said other amplifier tube having input and output electrodes with its input electrodes coupled to said frequency selecting circuit to create at its output electrodes amplified voltages of said selected multiple of the pilot carrier, an output circuit at each said station connected to the output electrodes of said other amplifier tube, whereby a carrier current for the transmission of said indication codes is produced.

References Cited in the file of this patent

UNITED STATES PATENTS

| | | |
|---|---|---|
| 2,117,580 | Snavely | May 17, 1938 |
| 2,141,551 | Phinney | Dec. 27, 1938 |
| 2,202,474 | Vroom | May 28, 1940 |
| 2,281,508 | Lundstrom | Apr. 28, 1942 |
| 2,411,375 | Jackel | Nov. 19, 1946 |
| 2,574,458 | Atkinson | Nov. 13, 1951 |
| 2,574,774 | Baughman | Nov. 13, 1951 |
| 2,581,056 | Walmsley | Jan. 1, 1952 |